US012211683B2

(12) United States Patent
West et al.

(10) Patent No.: US 12,211,683 B2
(45) Date of Patent: Jan. 28, 2025

(54) METHOD AND SYSTEM TO ALIGN THE FIRING OF A LASER ABLATION APPARATUS WITH THE CYCLIC MEASUREMENT PERIODS OF A MASS-SPECTROMETER

(71) Applicant: NORRIS SCIENTIFIC PTY LTD, Moonah (AU)

(72) Inventors: Nicholas Russell West, Evatt (AU); Charles Ashley Norris, Kignston (AU)

( * ) Notice: Subject to any disclaimer, the term of this patent is extended or adjusted under 35 U.S.C. 154(b) by 310 days.

(21) Appl. No.: 17/788,321

(22) PCT Filed: Mar. 10, 2020

(86) PCT No.: PCT/AU2020/050223

§ 371 (c)(1),
(2) Date: Jun. 23, 2022

(87) PCT Pub. No.: WO2021/179030

PCT Pub. Date: Sep. 16, 2021

(65) Prior Publication Data

US 2023/0028105 A1 Jan. 26, 2023

(51) Int. Cl.

| | |
|---|---|
| ***H01J 49/10*** | (2006.01) |
| ***H01J 49/00*** | (2006.01) |
| ***H01J 49/04*** | (2006.01) |
| ***H01J 49/42*** | (2006.01) |

(52) U.S. Cl.
CPC ........ *H01J 49/105* (2013.01); *H01J 49/0031* (2013.01); *H01J 49/0463* (2013.01); *H01J 49/4215* (2013.01)

(58) Field of Classification Search
CPC .. H01J 49/0463; H01J 49/105; H01J 49/0031; H01J 49/4215; H01J 49/26
USPC .......................................................... 250/288
See application file for complete search history.

(56) References Cited

U.S. PATENT DOCUMENTS 8,283,624 B2 * 10/2012 Antonov ............. H01J 49/0036 250/281
2018/0254176 A1 * 9/2018 Tanner .................. H04L 1/1664

* cited by examiner

*Primary Examiner* — Kiet T Nguyen

(57) ABSTRACT

The invention relates to a system for aligning the firing of a laser-ablation apparatus to a signal or property of an inductively-coupled-plasma mass-spectrometer apparatus. At least one kind of input unit that receives timing data from the mass-spectrometer and isolates the system. A processor configured to translate the mass cycle of the mass-spectrometer into a series of triggering signals to fire the laser. A delay circuit to retard the triggering signals by a specified duration. At least one kind of signal output unit to deliver a triggering signal to the laser. A method for configuring a system for controlling a laser in laser-ablation inductively-coupled-plasma mass-spectrometry as above. A computer program product for controlling a laser in laser-ablation inductively-coupled-plasma mass-spectrometry as above.

5 Claims, 3 Drawing Sheets

METHOD AND SYSTEM TO ALIGN THE FIRING OF A LASER ABLATION APPARATUS WITH THE CYCLIC MEASUREMENT PERIODS OF A MASS-SPECTROMETER

TECHNICAL FIELD

The present invention relates generally to the technical field of mass-spectrometry, particularly laser-ablation inductively-coupled-plasma mass-spectrometry (LA-ICP-MS) analytical methods and instrumentation, and more particularly to systems and methods for aligning the firing of a laser ablation apparatus with a signal or property of an inductively-coupled-plasma mass-spectrometer.

BACKGROUND ART

The technique of LA-ICP-MS, and related technologies, is effective for elemental or isotope analysis of solid and liquid samples.

The LA-ICP-MS technique requires three apparatuses (either fully integrated or provided by separate apparatuses): the laser-ablation apparatus for sample removal and transport, an inductively-coupled-plasma apparatus for sample dissociation and ionization, and a mass-spectrometer apparatus for mass separation and signal measurement.

A subset of mass-spectrometers employ a mass cycle approach, that is measuring masses sequentially and cycling continuously between multiple masses. This includes all mass-spectrometers based on quadrupole mass filters, as well as those equipped with a single detector which use magnetic sector and/or electrostatic mass filters.

Commonly, the laser vaporizes the sample material which is then transported to an analysis system in the form of an aerosol (i.e., a suspension of solid and possibly liquid particles and/or vapour in a carrier gas, such as helium gas). More particularly, a sample is typically produced by arranging the sample material within a laser ablation chamber, introducing a flow of a carrier gas within the sample chamber (also called "ablation cells") and ablating a portion of the sample material with one or more laser pulses to generate a plume containing particles and/or vapour ejected or otherwise generated from the target, suspended within the carrier gas (referred to hereafter as "target material"). The carrier gas containing the target material is directed to the inductively-coupled-plasma where the aerosol is dissociated and ionized, before it enters the mass-spectrometer, separated by mass, and is measured by one or more detectors.

Quadrupole mass filters and others that measure masses sequentially and cycle continuously between multiple masses are effectively scanning instruments. That is, to generate a single complete mass spectrum they monitor and record the signal intensity for a mass value for a brief period, move on to the next mass value, and repeat the entire process over and over to build up a representation of the complete composition of the target material. The term "mass measurement" is used throughout this document to refer to the period of time when the mass-spectrometer is measuring a single mass, and "mass measurements" refers to the pattern of measurements that comprise the "mass cycle". The mass measurements of the mass-spectrometer is typically determined by the number of masses to be measured and the required signal intensity for each mass.

During analysis the laser fires at a fixed frequency (typically in the range of 1 Hz to 100 Hz, but individual laser ablation apparatus may vary) for a specified duration (referred to hereafter as the "firing period" of the laser). The frequency is typically determined based on the response time of the laser ablation sample chamber and sample transfer system (referred to hereafter as the "response time"), in combination with the mass measurements of the mass-spectrometer. The response time is typically determined by parameters including the sample chamber geometry, transfer tubing geometry and material, gas flow rates, temperature, atmospheric pressure, ICP geometry and design, most importantly that of the injector.

During conventional LA-ICP-MS analysis, the response time is long relative to the firing period and the mass measurement, such that the measurable signal from the target material reaches the detection system as a continuous stream and sequential measurement by the mass-spectrometer is considered to represent the true composition of the target material. However, this method results in potentially considerable time to complete an analysis.

Developments in the LA-ICP-MS field has resulted in a proliferation of "fast response" laser ablation sample chambers (also called "fast ablation cells") which have response times on the order of 1-100 ms (defined as the time for the signal from a single laser pulse to decay to 1% of the maximum value), being substantially less than the response time of conventional ablation cells. These fast ablation cells are most useful for high speed imaging applications. Another benefit of using a fast ablation cell is that the signal intensity is higher, resulting in improved analytical precision, or in the case of imaging, data can be collected at higher resolution for the same analytical precision.

When using a fast ablation cell the response time is short relative to the firing period of the laser and the mass measurement of the mass-spectrometer. Commonly this results in the measurable signal varying in time, and sequential measurement by the mass-spectrometer does not represent the true composition of the sample.

Accordingly a problem to be solved is that of aliasing. Aliasing, by its ordinary meaning, is a term used to describe unwanted distortion or artefacts that arise whenever a periodic signal is sampled at an insufficient sampling rate. In the scientific research literature, aliasing in LA-ICP-MS is also referred to as "spectral skew".

A further problem is drift caused by changes in relative frequency between the laser ablation firing cycle and the mass-spectrometer mass cycle. When aliasing is present and the oscillators drift relative to one another then substantial changes (20-50%, though the exact value in any given instance depends on many factors, most importantly the response time) can be observed in the signal intensity measured by the mass-spectrometer.

In practice, problems due to aliasing in the LA-ICP-MS field have attempted to be mitigated to an extent by the use of smoothing devices to extend the response time. However this technique results in the undesired impact of extending the overall time required to perform the analysis, reducing sample throughput. With existing technology, the most direct approach to working with fast ablation cells is to fire the laser at a higher repetition rate. Doing so will produce a smoother signal and eliminate aliasing, but it will also remove too much material from the target sample, resulting in other undesired effects, such as poor ablation depth control and unwanted loading of the inductively-coupled-plasma.

While it is acknowledged that the issues of aliasing may not be of issue with respect to a limited subset of newer, specialized and especially costly LA-ICP-MS systems with a simultaneous detection system, LA-ICP-MS laboratories are more commonly using instruments that make sequential measurements, the most common example being the quadrupole mass-spectrometer.

SUMMARY OF INVENTION

The present invention is directed to a system and method for eliminating aliasing in mass cycle LA-ICP-MS systems which avoids the aforementioned disadvantages by optimizing the alignment of the firing period of the laser with the mass measurements of the mass-spectrometer.

More particularly, the invention is directed at a system comprising:

at least one kind of input unit configured to receive one or more timing signals of the mass-spectrometer that can be used to interpret the mass measurements, and communicate this data to a processor, and to isolate the system from the mass-spectrometer a processor configured to receive the timing signals from the input unit, translate the mass measurements of the mass-spectrometer into a series of triggering signals for the firing of the laser, and communicate the triggering signals to a delay unit a delay unit configured to receive triggering signals from the processer, retard the laser firing period for a specified duration and then communicate the triggering signals to an output unit an output unit configured to receive triggering signals from the delay unit, modify the triggering signal to be compatible with the laser and to communicate the modified triggering signal to the laser The invention further provides a method for eliminating aliasing in mass cycle LA-ICP-MS systems by optimizing the alignment of the firing period of the laser with the mass measurements of the mass-spectrometer, comprising the following steps:

providing a system capable of receiving one or more timing signals of the mass-spectrometer and translate the mass measurements into a series of triggering signals for the firing of the laser, providing a delay unit configured to receive triggering signals, retard the laser firing period for a specified duration and communicate the triggering signals to an output unit provide an output unit configured to receive triggering signals from the delay unit, modify the triggering signal to be compatible with the laser and to communicate the modified triggering signal to the laser The features, aspects and advantage of the present invention will become better understood with regard to the following description, appended claims, and accompanying drawings.

DESCRIPTION OF EMBODIMENTS

The particularly advantageous embodiments of the invention are described in detail below with reference to the accompanying drawings.

Figure 1:
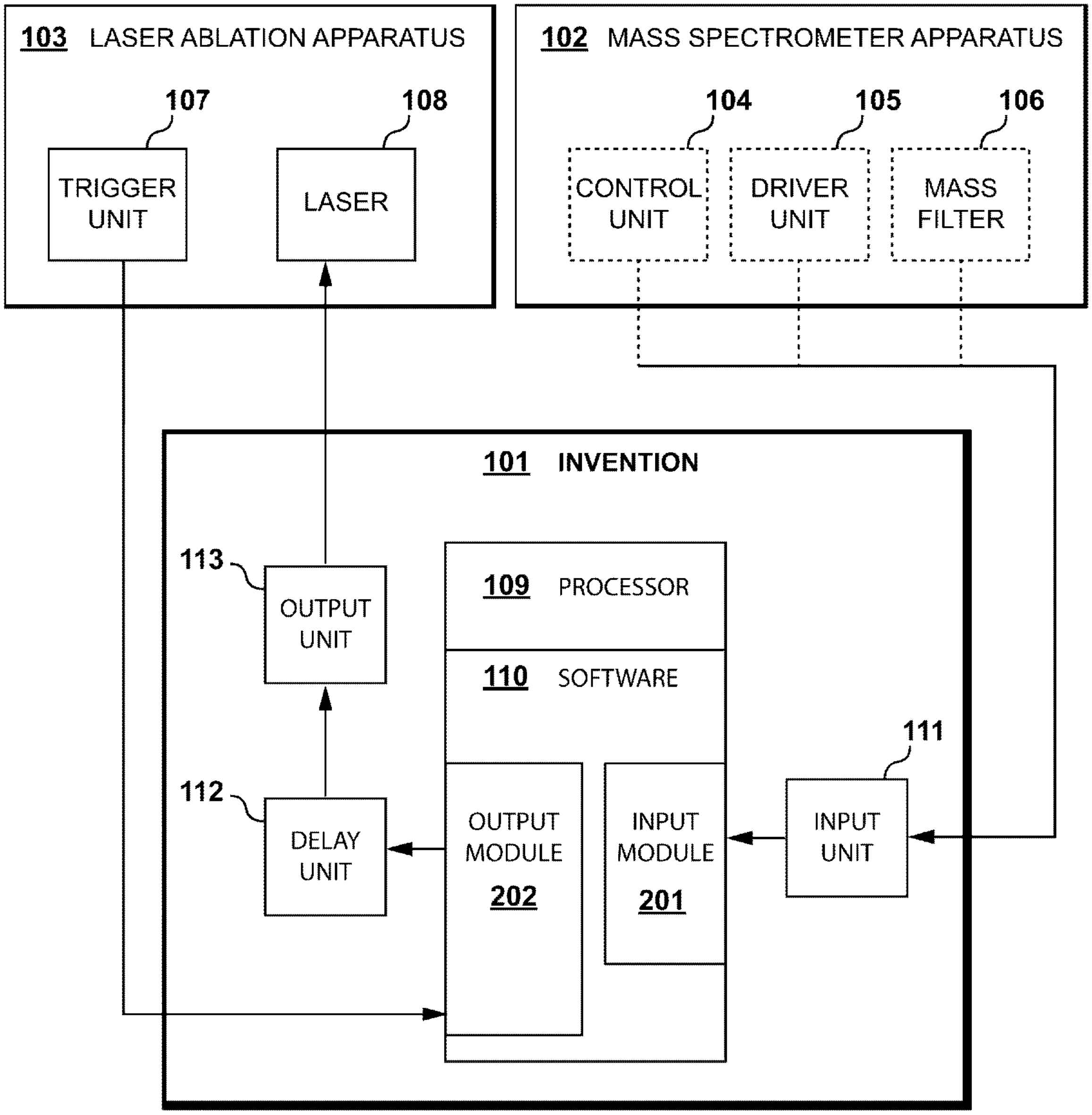
FIG. 1 is a block diagram according to one embodiment of the invention (101) and the logical connections in relation to the laser-ablation (103) and mass-spectrometer (102) apparatuses.

FIG. 1 is an embodiment of the invention comprising a system (101) that connects electrically with both the laser ablation apparatus (103) and the mass-spectrometer apparatus (102). The two aforementioned apparatuses may be effected as physically separate instruments, or they may comprise relevant components of a single instrument.

The system (101) measures the mass cycle of the mass-spectrometer (102). To accommodate different types and configurations of mass-spectrometers, separate embodiments of the device integrate with the mass-spectrometer using at least one of the following three ways:

In the first way, the system utilizes at least one triggering signal produced by the mass-spectrometer control circuit (104). This signal may be intentionally generated by the control circuit for the purpose that other devices will read it, or the signal may be incidental in nature (such as a blinking light, time varying voltage, or digital signal) and intercepted for the purpose of measuring the mass cycle of the mass-spectrometer. One example of an intentional signal would be an electrical connection that generates transient positive voltage pulses each time the mass filter jumps to the next mass, and a transient negative voltage pulse each time the mass cycle resets.

In the second way, the system measures at least one property, such as a voltage or frequency, of the driver circuit (5) that causes the mass filter (6) to function. Here the signal is intrinsic to the driver circuit and the device measures it without affecting the operation of the driver circuit. One example would be a circuit designed to measure the DC or AC voltage generated to drive a quadrupole mass filter.

In the third way the system measures at least one physical property close to, or part of, the mass filter (6) itself, such as a magnetic or electric field. Here, the signal is intrinsic to the mass filter or the space surrounding the mass filter and the property is measured without affecting the operation of the mass filter. One example would be a hall-effect sensor, placed close to and measuring the magnetic field produced by an electromagnetic mass filter.

In a fourth way, a programmed period signal may be substituted for an actual parameter of the mass-spectrometer such as those outlined in ways one to three above. However, this is not a preferred embodiment of the invention as any results derived will not be based on the real behaviour of the mass-spectrometer.

The signal representing the mass cycle of the mass-spectrometer is connected to the system via at least one input unit (111). The purpose is to isolate the system from the mass-spectrometer to ensure the presence of the system does not interfere with the correct and regular operation of the mass-spectrometer, as well as to interpret the signal from the mass-spectrometer and to send it on to the processor (109). Examples of an appropriate input unit would be a voltage divider, operational amplifier, buffering capacitor, optical isolator, or digital computer interface or combination thereof.

In some embodiments of the invention, the signaling pathway shown in FIG. 1 can be embodied entirely by computer software transmitting commands via a local network or between software programs running on the computer controlling, and communicating with, the mass-spectrometer.

The system utilizes a processor (109) that may be implemented in some embodiments by way of a micro-controller running a software package (110), or by way of a general purpose programmable computer running a software package, or as an electrical circuit comprising discrete components, or any combination thereof. The processor utilizes appropriate circuity (e.g. analog-digital converter, or digital logic gates) to interpret the signal from the input unit (111). It also contains circuitry to support software implementing the logic of operation shown by FIG. 2. The processor generates electrical pulses, or computer software commands transmitted by appropriate hardware, for the purpose of triggering the laser (108) to fire.

The processor (109) generates a series of triggering signals that pass to a delay unit (112). The delay unit is configured by the system and is capable of retarding progression of the triggering signals by a specified duration. The delay is necessary to account for the transport time of the ablated material as it moves from the laser ablation component (103) to the mass-spectrometer (102). It is possible that in some circumstances the delay time could be set to zero.

The train of triggering signals pass to an output unit (113) that modifies the signals to be compatible with the make and model of the laser (108) which is part of the laser ablation apparatus (103). The triggering signals cause the laser to fire at the specified moments in time.

As the laser fires it removes material from the sample, which is vaporized and transported by the carrier gas through appropriate transfer tubing, via the inductively-coupled-plasma, to the mass-spectrometer. Due to the causal arrow of time, material removed by a laser pulse effected by a specified mass cycle will be measured by a later mass cycle (by either one or more) of the mass-spectrometer. Because cycle-to-cycle variations are small (<1%) over short periods of time (<5 s) and the transport time is likewise relatively constant, timing jitter is insignificant such that the sample will arrive at the detector with the same relative timing as shown by the triggering patterns in FIG. 3. For example, when operating in “MODE B (N=1)” (303) the arrival to the detector of material arising from each laser pulse will be coincident with each mass measurement of the mass-spectrometer.

Figure 2:
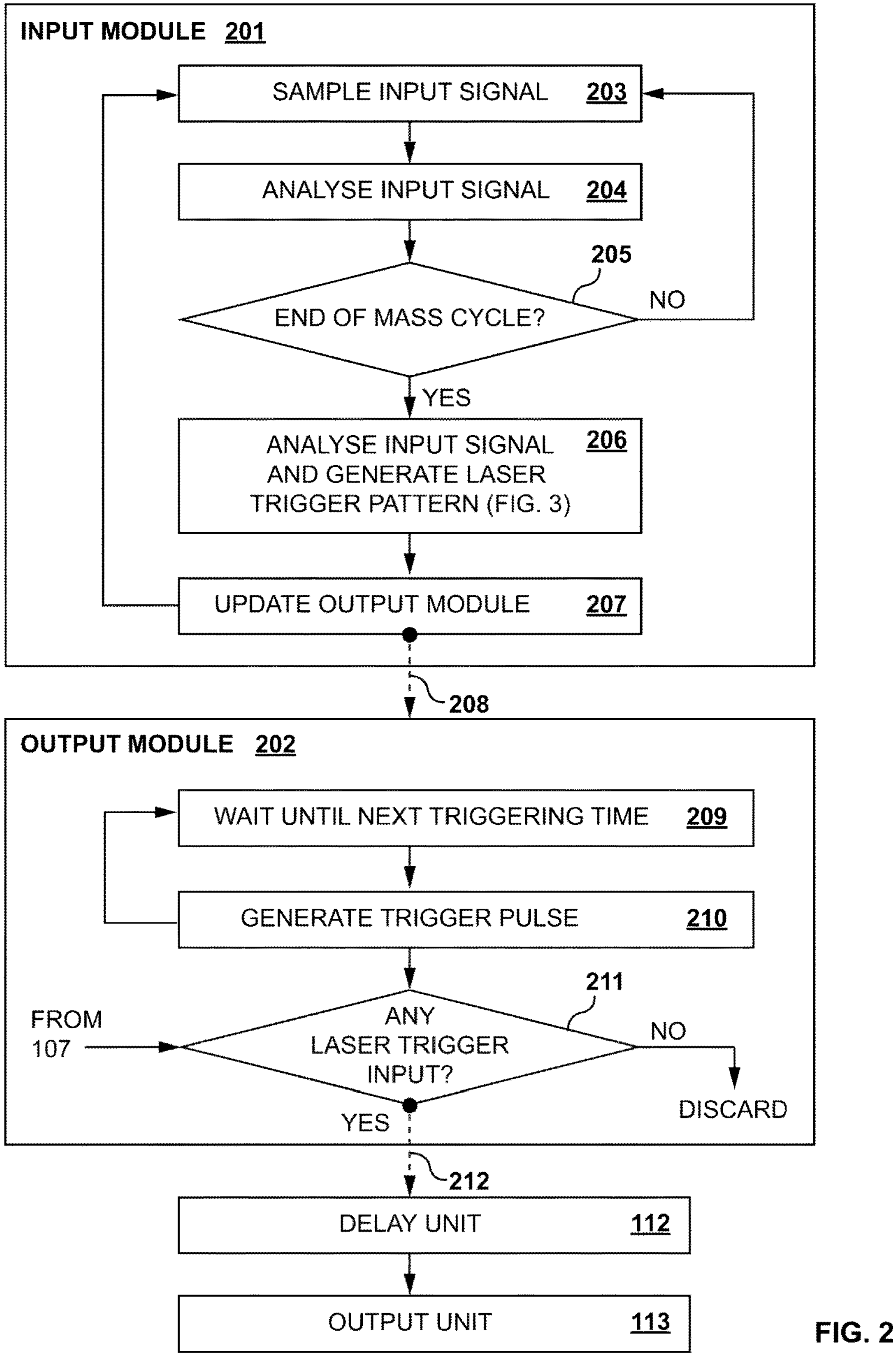
FIG. 2 is a flow chart describing the logical operation of the control circuit in one embodiment of the device.

The flow chart in FIG. 2 shows the operating program followed by one embodiment of the processor (109). In an embodiment the operating program can be implemented using computer software (110) running on a general purpose processor. In another embodiment it can be implemented by way of discrete electronic components, or a combination of software and hardware.

For clarity, the illustrated embodiment shows two logical modules, one processing the input (201) and a second generating the output (202) that together represent the program governing operation of the system. Different embodiments of the system can combine processing steps in any combination provided that the final operation is in effect the same as that illustrated.

Starting with sampling the input signal (203) the input module operates a cycle (203→204→205→203) that continuously measures and interprets the signal from the mass-spectrometer mass cycle. During each loop of the program the system analyses (204) the signal to determine when the changes in mass measurement take place and also to detect the end of the mass cycle, which is defined as the moment in time when the mass filter returns to the starting position. In most cases the cycle begins with the lightest mass, but any mass can be arbitrarily defined to be the starting point of the mass cycle. Once the end of the mass cycle is detected, the entire mass cycle is then analyzed (206), the position in time of each mass measurement over the cycle is identified, and the output triggering signals, is generated based on the mode of operation of the system and the settings specified by the user. Sufficient processing capacity is available so that the system can generate the laser trigger pattern in a period of time comprising no more than a small fraction (<0.1%) of the total time of the cycle.

A different embodiment of the device detects the mass jumps in real time and determines the triggering signals as the cycle progresses, thus not requiring step (206). The limitation of such an embodiment is that it can operate using “MODE B” only (see FIG. 3).

Once the triggering signal has been determined the output module is updated (207) by an internal process that passes the timing information asynchronously (208) to the output module and the input module returns immediately to (203) to begin measuring the next mass cycle. During the update of the output module (207) different embodiments of the device either update the trigger pattern directly, or the trigger pattern is filtered by combining it with that generated by previous cycles, for example by calculating an N-point moving average to smooth out cycle-to-cycle variation.

The output module (202) operates a continuous cycle (209→210→209) that acts on the current trigger pattern and generates the next trigger pulse (210). The module receives input (211) from the laser ablation apparatus trigger unit (107) and discards each generated trigger pulse if the laser is not being triggered to fire within a specified time window. If the laser is being triggered then the trigger pulses are passed asynchronously (212) from the output module to the delay unit (112) which retards the pulses in time by a specified period of time. After the delay period the pulses pass to the output unit (113) which modifies the signals to those appropriate to the laser (107) and communicates them to the laser causing it to fire in accordance with the generated triggering pattern (206).

Figure 3:
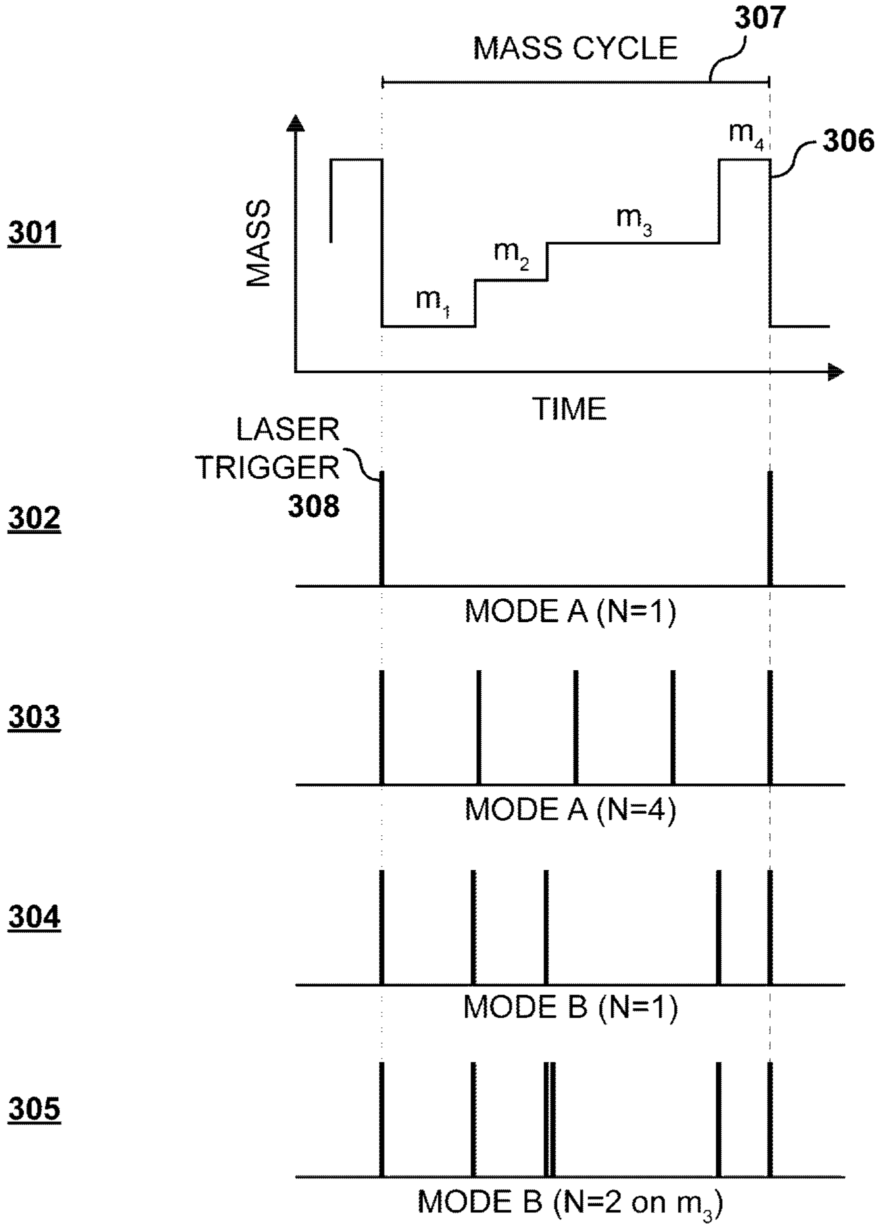
FIG. 3 is a representative mass cycle (306) from the mass-spectrometer and the examples of laser triggering signals generated by an embodiment of the invention in different modes of operation, when configured with the parameters indicated (302, 303, 304, 305).

The charts shown in FIG. 3 all share a common time axis, with chart 301 showing a representative trace of the position of the mass filter (306) for four masses over the mass cycle (307) of the mass-spectrometer. Charts 302-305 show the resulting pattern of laser trigger signals (308) generated by the embodiment of the invention in response to this pattern.

As referred earlier “mass measurement” is used throughout this document to refer to the period of time when the mass-spectrometer is measuring a single mass, and “mass measurements” refers to the pattern of measurements that comprise the “mass cycle”. Chart 301 shows four exemplary mass measurements in a mass cycle which is indicative only, the mass-spectrometer may be measuring any number of masses.

The laser triggering signal patterns are generated by the system according to the mode of operation chosen by the user. The operating modes determine when the laser is triggered in relation to the mass cycle of the mass-spectrometer. The modes are described forthwith:

In “MODE A” laser triggering pulses are aligned to the mass cycle, or by specified divisions thereof. Example (303) shows four triggering pulses per mass cycle and example (302) shows a single triggering pulse per mass cycle. Any division or multiplication in time of the mass cycle is possible, either uniform (e.g. divided or multiplied by an integer) or otherwise.

In “MODE B” laser triggering pulses are aligned to the individual mass measurement periods. This can be effected as either:

a single trigger pulse per mass measurement (304), a specified number of laser pulses per mass measurement, e.g. N=2, a variable number of laser pulses per mass measurement (305).

Furthermore, when operating in MODE B the laser triggering pulses may be each individually delayed relative to the mass measurement of the mass-spectrometer (not shown).

When multiple pulses are generated per mass measurement the system either subdivides the mass measurement period by a set number of intervals, or it separates pulses by a set period of time. It is advantageous to fire the multiple pulses as rapidly as possible, so when using a set period of time it is advantageous to derive the period from the maximum repetition rate at which the laser can fire, otherwise it is specified by the user.

The example shown (305) produces a single pulse per mass measurement and two pulses for the measurement of mass 3.

In an embodiment (not shown) the system is additionally configured to be capable of electrically isolating the system from the laser ablation apparatus trigger unit, such that the trigger signals for the laser pass through the system without interference or modification by the system. The advantage of this is that the system need not be removed from the LA-ICP-MS when not required for a particular analysis.

The invention claimed is:

1. A system for aligning a firing of a laser used for laser-ablation inductively-coupled-plasma mass-spectrometry (LA-ICP-MS) with mass measurements of a mass-spectrometer, comprising:

at least one kind of input unit configured to
- receive one or more timing signals of the mass-spectrometer,
- communicate the timing signals to a processor, and
- isolate the system from an operation of the mass-spectrometer;

a processor configured to
- receive the timing signals from the input unit,
- interpret the mass measurements from the timing signals,
- translate the mass measurements into a series of laser triggering signals,
- receive signals from a laser ablation apparatus trigger unit, and
- communicate the laser triggering signals to a delay unit;

a delay unit configured to
- receive triggering signals from the processor,
- delay the triggering signals by a specified duration, and
- communicate the triggering signals to an output unit; and an output unit configured to
- receive the triggering signals from the delay unit,
- modify the triggering signals to be compatible with the laser, and
- communicate the triggering signals to the laser-ablation apparatus.

2. The system of claim 1 additionally configured to be capable of isolating the system from the laser ablation apparatus trigger unit.

3. The system of claim 1 or 2 where the processor is comprised of one or more analog or digital electronic units.

4. A method for aligning a firing of a laser used for laser-ablation inductively-coupled-plasma mass-spectrometry (LA-ICP-MS) with a mass cycle of a mass-spectrometer comprising the steps of:

providing at least one kind of input unit configured to
- receive one or more timing signals of the mass-spectrometer,
- communicate the timing signals to a processor, and
- isolate a system from an operation of the mass-spectrometer;

providing a processor configured to
- receive the timing signals from the input unit,
- interpret mass measurements from the timing signals,
- translate the mass measurements into a series of laser triggering signals,
- receive signals from a laser ablation apparatus trigger unit, and
- communicate the laser triggering signals to a delay unit;

providing a delay unit configured to
- receive the triggering signals from the processor,
- delay the triggering signals by a specified duration, and
- communicate the triggering signals to the output unit; and provide an output unit configured to
- receive the triggering signals from the delay unit,
- modify the triggering signals to be compatible with the laser, and
- communicate the triggering signals to the laser-ablation apparatus.

5. A computer program product comprising a non-transient computer readable medium containing instructions comprised of one or more software modules for causing a computer to perform a method of aligning a firing of a laser used for laser-ablation inductively-coupled-plasma mass-spectrometry (LA-ICP-MS) with a mass cycle of a mass-spectrometer, the method comprising:

receiving one or more timing signals of the mass-spectrometer, interpreting mass measurements from the timing signals;
- translating the mass measurements into a series of laser triggering signals;
- receiving signals from a laser ablation apparatus trigger unit;
- delaying the triggering signals by a specified duration;
- modifying the triggering signals to be compatible with the laser; and
- communicating the triggering signals to a laser-ablation apparatus.

* * * * *